United States Patent [19]

Koseki et al.

[11] Patent Number: 5,082,484
[45] Date of Patent: Jan. 21, 1992

[54] APPARATUS FOR MAKING QUARTZ GLASS CRUCIBLES

[75] Inventors: Tadao Koseki; Akihiko Koseki; Kohichi Hirata; Haruhiko Itoh, all of Oguni, Japan

[73] Assignee: Toshiba Ceramics Co., Ltd., Japan

[21] Appl. No.: 583,553

[22] Filed: Sep. 17, 1990

[30] Foreign Application Priority Data

Sep. 25, 1989 [JP] Japan .................. 1-248597

[51] Int. Cl.⁵ .............................................. C03B 19/06
[52] U.S. Cl. ........................................ 65/144; 65/302; 65/361; 164/301; 425/425; 425/434; 425/DIG. 201
[58] Field of Search .................. 65/302, 361, 144; 425/425, 434, DIG. 201; 164/301, 310

[56] References Cited

U.S. PATENT DOCUMENTS

| | | | |
|---|---|---|---|
| 1,190,145 | 7/1916 | Gift | 65/302 |
| 3,841,859 | 10/1974 | Becker et al. | 65/361 X |
| 3,935,046 | 6/1990 | Uchikawa et al. | 65/302 X |
| 4,116,260 | 9/1978 | Pierrel | 164/301 X |
| 4,416,680 | 11/1983 | Bruning et al. | 65/144 |
| 4,528,163 | 7/1985 | Albrecht | 422/249 |
| 4,759,787 | 7/1988 | Winterburn | 65/30.1 |
| 4,874,417 | 10/1989 | Winterburn | 65/111 |

FOREIGN PATENT DOCUMENTS 53-45318  4/1978  Japan .

Primary Examiner—Robert L. Lindsay
Attorney, Agent, or Firm—Lorusso & Loud

[57] ABSTRACT

An apparatus for making a quartz glass crucible comprises a housing having a first chamber and a second chamber therein, a rotation crucible having an inner surface corresponding in configuration to the quartz glass crucible, means for rotating the rotation crucible, means for shifting the rotation crucible and the rotating means together between the first and second chambers, means placed in the first chamber for feeding a grain material into the rotation crucible, means placed in the first chamber for shaping the grain material in the rotation crucible so as to form a shaped body in the shape of the quartz glass crucible when the rotation crucible rotates, and means placed in the second chamber for heating and fusing the shaped body within the rotation crucible so as to make the quartz glass crucible.

16 Claims, 1 Drawing Sheet

5,082,484

APPARATUS FOR MAKING QUARTZ GLASS CRUCIBLES

BACKGROUND OF THE INVENTION

This invention relates to an apparatus for making quartz glass crucibles.

Quartz glass crucibles are used to hold molten silicon during the growing of a silicon crystal rod. Such quartz glass crucibles are manufactured by an apparatus having a rotation table which reciprocally moves between a feeding and shaping station and a heating and fusing station. As disclosed in Japanese Patent Laid-Open No. 53-45318, a pair of rotation crucibles are rotatably provided on the rotation table. A predetermined volume of grain material is fed into one of the rotation crucibles and shaped by a shaping means so as to form a shaped body therein at the feeding and shaping station, while the shaped body in the other rotation crucible is heated and fused so as to form a quartz glass crucible therein at the heating and fusing station. After that, the table rotates by 180 degrees, and the quartz glass crucible in the other rotation crucible is removed therefrom while the shaped body in the one rotation crucible is heated and fused at the heating and fusing station. Such steps are repeated.

The table and the stations are not enclosed. Thus, impurities are apt to be included in the quartz glass crucibles manufactured by the conventional apparatus. It is difficult to control the quality of the quartz glass crucibles. Also, the working atmosphere is bad because of the heat produced at the heating and fusing station.

SUMMARY OF THE INVENTION

An object of this invention is to provide an apparatus for manufacturing quartz glass crucibles in which impurities can be prevented from mixing therewith.

A further object of this invention is to provide an apparatus for manufacturing quartz glass crucibles in which a good working atmosphere can be maintained at a heating and fusing station.

According to this invention, an apparatus for manufacturing quartz glass crucibles comprises a housing having a first chamber and a second chamber therein, a rotation crucible having an inner surface corresponding in configuration to the quartz glass crucible, means for rotating the rotation crucible, means for shifting the rotation crucible and the rotating means together between the first and second chambers, means placed in the first chamber for feeding a grain material into the rotation crucible, means placed in the first chamber for shaping the grain material in the rotation crucible so as to form a shaped body in the shape of the quartz glass crucible when the rotation crucible rotates, and means placed in the second chamber for heating and fusing the shaped body within the rotation crucible so as to make the quartz glass crucible.

An apparatus according to this invention is equipped with a housing having a chamber in which a grain material is fed into the rotation crucible and shaped so as to form a shaped body. Thus, any impurities or the like can be prevented from entering into the rotation crucible when the grain material is fed and shaped in the rotation crucible.

Also, as the housing has a chamber in which the shaped body is heated and fused, the heat produced therein can be prevented from adversely affecting the working atmosphere or conditions.

Further, as the rotation crucible and the rotating means are shifted between the feeding and shaping chamber and the heating and fusing chamber, the feeding, shaping, heating and fusing steps can be easily carried in a continuous manner so as to increase the production efficiency. In particular, if a heating and fusing chamber is placed between a pair of feeding and shaping chambers, the production efficiency remarkably increases.

DETAILED DESCRIPTION OF THE EMBODIMENT

Figure 1:
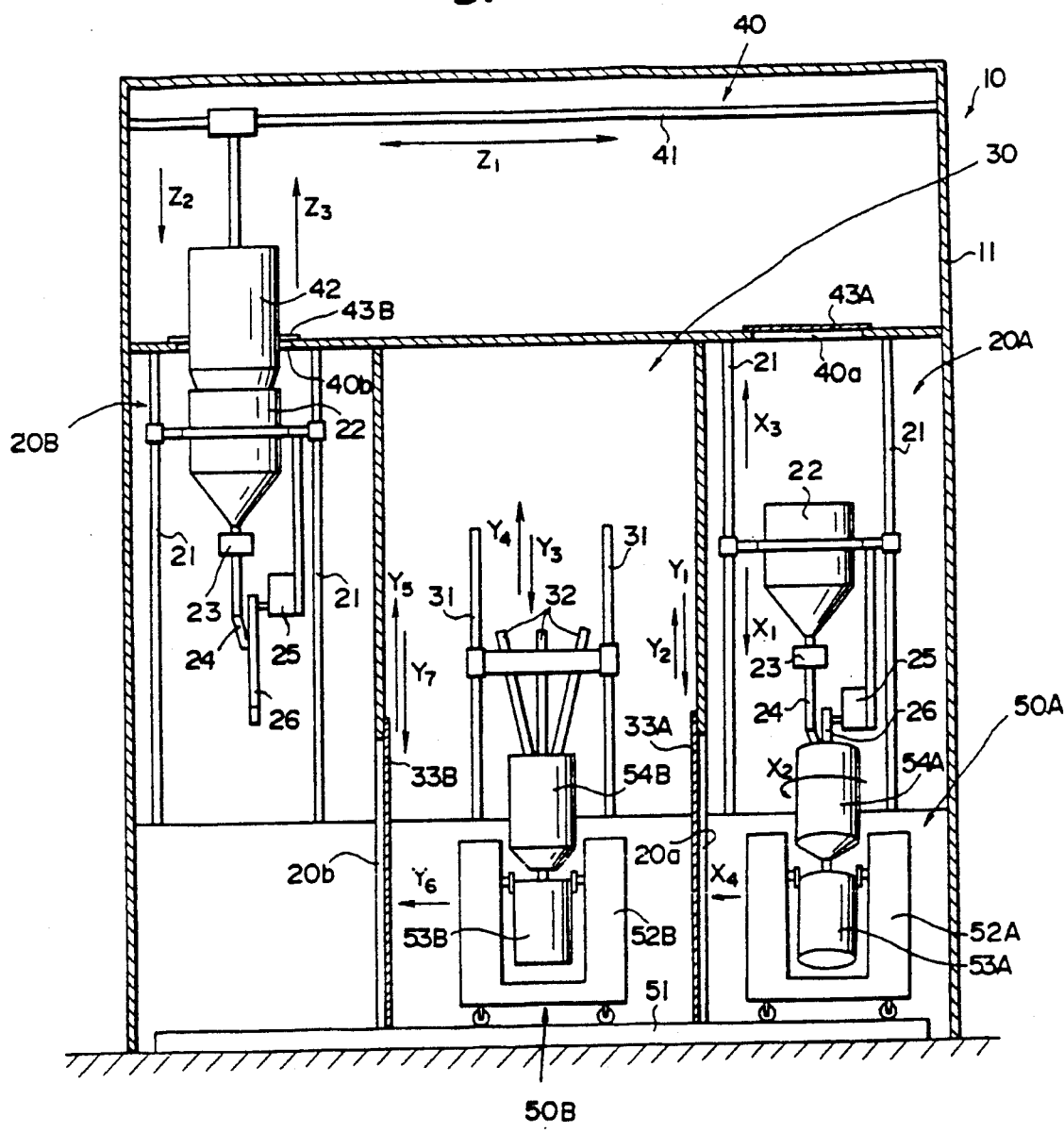
FIG. 1 is a sectional view showing schematically a front side of an apparatus for manufacturing quartz glass crucibles according to a preferred embodiment of this invention.

Referring to FIG. 1, an apparatus for manufacturing quartz glass crucibles is generally designated by 10. The apparatus 10 includes a pair of charging or feeding and shaping chambers 20A, 20B, a heating and fusing chamber 30, a make-up chamber 40, and two rotation crucible devices 50A, 50B. A housing 11 includes plural vertical and horizontal walls so as to define the chambers 20A, 20B, 30, 40 therein in such a way that all chambers are normally closed. Each chamber is independent and in a closed manner so that no impurities or heat can come into the chamber from the other chambers or the atmosphere.

In the chambers 20A, 20B, a predetermined volume of starting grain material for making a quartz glass crucible is fed into one of the rotation crucibles 54A, 54B and shaped so as to make a shaped body corresponding in configuration to the desired form of a quartz glass crucible for holding molten silicon during the growing of a silicon crystal rod.

The chamber 30 is positioned between the pair of chambers 20A, 20B within the housing 11. In the chamber 30, the shaped body is heated and fused so as to become a quartz glass crucible.

The make-up chamber 40 is positioned over the chambers 20A, 20B, 30 within the housing 11. The grain materials are made up in the chamber 40 and transferred from the chamber 40 to the chambers 20A, 20B.

The rotation crucible device 50A equipped with the rotation crucible 54A reciprocally moves between the adjacent chambers 20A and 30. The rotation crucible device 50B equipped with the rotation crucible 54B moves reciprocally between the adjacent chambers 20B and 30. When one of the two rotation crucible devices 50A, 50B is positioned within the intermediate chamber 30, the other rotation crucible device is positioned within the chamber 20A or 20B.

One of the feeding and shaping chambers 20A, 20B can be omitted although the operation efficiency decreases.

Each of the chambers 20A, 20B includes a guide rail 21, a hopper 22 which holds a lot of grain material and vertically moves along the guide rail 21, a control valve 23 fixed to a lower end opening of the hopper 22 for controlling the volume of the grain material fed into the rotation crucible 54A or 54B, a pipe 24 downwardly extending from the lower end opening of the hopper 22 through the valve 23 for feeding the grain material into the rotation crucible 54A or 54B, a control device 25 which moves vertically along the guide rail 21 together with the hopper 22, and a tool 26 controlled by the control device 25 for shaping the grain material in the rotation crucible 54A or 54B after the tool 26 is inserted into the rotation crucible 54A or 54B.

In the chamber 30, three electrodes 32 are connected via a power control device (not shown) to a power source (not shown) and are designed to move vertically along plural guide rails 31 for heating and fusing the shaped body in the rotation crucible 54A, 54B by an electric arc so as to make a quartz glass crucible in the rotation crucible.

Two closures 33A, 33B are slidably set on vertical walls of the chamber 30 for selectively opening and closing connect holes 20a and 20b.

In the chamber 40, a guide bar 41 extends in a horizontal direction over the chambers 20A, 20B, 30. A tank 42 hangs from the guide bar 41. The tank 42 horizontally moves along the guide bar 41 and vertically moves into and out of the chambers 20A, 20B by driving means (not shown). Two closures 43A, 43B are slidably set on connect holes 40a, 40b formed in the bottom of the chamber 40. The closures 43A, 43B are designed to close the connect holes 40a, 40b when the tank 42 is not in the chambers 20A, 20B.

The rotation crucible devices 50A, 50B include respective shifting means 52A, 52B each having four wheels so as to be moved smoothly on a common guide rail 51 by a driving means (not shown) between the pair of chambers 20A, 20B and the intermediate chamber 30. The rotation crucible devices 50A, 50B further include crucible rotation means 53A, 53B attached to the shifting means 52A, 52B in such a way that the crucible rotation means 53A, 53B can tilt, and rotation crucibles 54A, 54B attached to the crucible rotation means 53A, 53B such that the rotation crucibles 54A, 54B can rotate by means of and together with the crucible rotation means 53A, 53B in the direction X2.

As shown in FIG. 1, the shifting means 52A and the rotation crucible 54A are positioned in the chamber 20A where the grain material is fed into the rotation crucible 54A. In the chamber 20B, the grain material be fed into the hopper 22 from the tank 42. In the chamber 30, the shaped body in the rotation crucible 54B is heated and fused.

In operation, after a quartz glass crucible is formed in the rotation crucible 54A, the rotation crucible device 50A moves from the chamber 30 to the chamber 20A via the connect hole 20a along the guide rail 51. The quartz glass crucible is removed from the rotation crucible 54A by an operator.

The crucible rotation means 53A tilts rearwardly together with the rotation crucible 54A by a predetermined angle such as 18 degrees. The hopper 22 moves down along the guide rail 21 in the direction $X_1$ so that the lower end of the pipe 24 and the shaping tool 26 are inserted into the rotation crucible 54A through its upper opening. The rotation crucible 54A starts to rotate in the direction $X_2$ by means of the crucible rotation means 53A. After that, the valve 23 opens, and the material is continuously fed via the pipe 24 into the rotation crucible 54A. Due to the centrifugal force, the material gradually spreads on the inner surface of the rotation crucible 54A, and then it is shaped by the tool 26 whereby a shaped body having a given thickness is formed in the rotation crucible 54A in the shape of the desired quartz glass crucible having a U-shaped vertical section.

The hopper 22 moves up together with the pipe 24 and the shaping tool 26 in the direction $X_3$ along the guide rail 21. When the pipe 24 and the tool 26 move completely out of the rotation crucible 54A, the crucible rotation means 53A and the rotation crucible 54A move back to their original vertical position while the rotation crucible 54A continues to rotate.

The closure 33A moves in the direction $Y_2$ so as to open the connect hole 20a. The shifting means 52A moves in the direction $X_4$ along the rail 51 from the chamber 20A into the chamber 30 through the connect hole 20a while the rotation crucible 54A continuously rotates. When the shifting means 52A stops in position within the chamber 30, the closure 33A moves down so as to close the connect hole 20a.

The electrodes 32 move down in the direction $Y_3$ along the guide rails 31 so that the lower tip portions of the electrodes 32 are inserted into the shaped body in the rotation crucible 54A. The shaped body is heated and fused in the rotation crucible 54A by the arc from of the electrodes 32 while the rotation crucible 54A rotates continuously. After the quartz glass crucible is fused to a predetermined degree, the electrodes 32 move up in the direction $Y_4$. When they reach a predetermined upper position, the closure 33A opens, and then the rotation crucible device 50A moves back to its original position along the rail 51 in the chamber 20A as shown in FIG. 1.

On the other hand, while the grain material is fed into the rotation crucible 54A in one rotation crucible device 50A, the other rotation crucible device 50B is positioned in the intermediate chamber 30. A shaped body in the rotation crucible 54B is heated and fused by the electrodes 32 so as to become a quartz glass crucible having a U-shaped vertical section.

After the electrodes 32 move up to their upper position, the closure 33B moves up in the direction $Y_5$ so as to open the connect hole 20b. The rotation crucible device 50B moves in the direction $Y_6$ along the rail 51 from the intermediate chamber 30 into the left chamber 20B through the connect hole 20b. When the shifting means 52B stops in position within the chamber 20B, the closure 33B moves down in the direction $Y_7$ so as to close the connect hole 20b. After that, the crucible device 50A again moves into the chamber 30.

In the left chamber 20B, the crucible rotation means 53B stops rotating and tilts forwardly together with the rotation crucible 54B. The quartz glass crucible is removed from the rotation crucible 54B by an operator while the rotation crucible is stopped. After that, the crucible rotation means 53B and the rotation crucible 54B move to their original vertical position and then start to rotate once again. They further tilt rearwardly as in the above described operation of the rotation crucible device 50A. The pipe 24 and the shaping tool 26 move down so that they are partly inserted into the shaped body formed in the rotation crucible 54B.

All of feeding, shaping, shifting, heating, fusing and removing steps in the rotation crucible device 50B are substantially the same as those in the rotation crucible device 50A.

If the level of the grain material in the hopper 22 becomes low as detected by a sensor, then the closure 43A or 43B moves to open the connect hole 40a or 40b. The tank 42 moves horizontally and vertically in the directions $Z_1$, $Z_2$ so that the lower end of the tank is inserted into the hopper 22. The grain material is fed into the hopper 22 from the tank 42.

After the make-up step of the tank 42 is finished, it moves up in the direction Z₃ into the chamber 40. The closure 43B is closed. The tank 42 is always ready to make up in the chambers 20A, 20B.

What is claimed is:

1. An apparatus for making a quartz glass crucible, comprising:
   a housing having wall means dividing said housing into a first chamber and a second chamber;
   a rotation crucible having an inner surface corresponding in configuration to the quartz glass crucible;
   rotation means for rotating the rotation crucible;
   reciprocating means for reciprocably shifting the rotation crucible and the rotating means together between the first and
   access means including an opening in said wall means for permitting said rotation crucible together with said rotation means to pass between said first and second chambers and movable cover means for covering and uncovering said opening responsive to the reciprocating movement of said rotation crucible together with said rotation means;
   feed means mounted in the first chamber for feeding a particulate material into the rotation crucible;
   tool means mounted in said first chamber for shaping the particulate material in the rotation crucible so as to form a shaped body in the shape of the quartz glass crucible as the rotation crucible rotates; and
   heating means mounted in said second chamber for heating and fusing the shaped body within the rotation crucible so as to make the quartz glass crucible.

2. The apparatus of claim 1, wherein said reciprocating means comprises a guide rail along which said rotation crucible and rotation means move together reciprocally between the first and second chambers.

3. The apparatus of claim 1, wherein the feeding means includes a hopper having a lower open end, a pipe joined to the lower open end of the hopper, and a valve for controlling the volume of the material fed through the pipe into the crucible.

4. The apparatus of claim 1, wherein the tool means includes tool control means for positioning a tool within said rotation crucible and for withdrawing said tool from said rotation crucible.

5. The apparatus of claim 1, wherein the heating and fusing means includes three electrodes having three poles, and guide means along which the electrodes move in a vertical direction.

6. The apparatus of claim 3, wherein the housing has further a make-up chamber positioned above and coextensive with the first and second chambers.

7. The apparatus of claim 6, further comprising a make-up tank and means for moving said make-up tank within the make-up chamber in such a way that the particulate material can be stored in said make-up tank and fed from said make-up tank into the hopper.

8. The apparatus of claim 1, wherein said rotation means has means for continuously rotating said rotation crucible as said rotation crucible moves from the first chamber to the second chamber, after the grain material is fed into the rotation crucible and until the shaped body is fused.

9. An apparatus for making a quartz glass crucible, comprising:
   a housing having wall means defining a pair of first and second chambers and an intermediate chamber therebetween;
   first and second rotation crucibles each having an inner surface corresponding in configuration to the quartz glass crucible;
   first rotation means for rotating the first rotation crucible;
   second rotation means for rotating the second rotation crucible;
   first reciprocating means for shifting said first rotation crucible and said first rotation means together between said first chamber and said intermediate chamber;
   second reciprocating means for shifting said second rotation crucible and said second rotation means together between the second chamber and the intermediate chamber;
   first access means including a first opening in said wall means for permitting said first rotation crucible, together with said first rotation means to pass between said first chamber and said intermediate chamber and first cover means for covering and uncovering said first opening responsive to the reciprocating movement of said first rotation crucible together with said first rotation means;
   second access means including a second opening in said wall means for permitting said second rotation crucible, together with said second rotation means, to pass between said second chamber and said intermediate chamber and second cover means for covering and uncovering said second opening responsive to the reciprocating movement of said second rotation crucible together with said second rotation means;
   first feed means mounted in said first chamber for feeding a particulate material into the first rotation crucible;
   second feed means mounted in said second chamber for feeding a particulate material into the second rotation crucible;
   first tool means mounted in said first chamber for shaping the particulate material in the first rotation crucible so as to form a shaped body in the shape of the quartz glass crucible as the first rotation crucible rotates;
   second tool means mounted in said second chamber for shaping the particulate material in the second rotation crucible so as to form a shaped body in the shape of the quartz glass crucible as the second rotation crucible rotates; and
   heating means mounted in said intermediate chamber for heating and fusing the shaped body within one of the first and second rotation crucibles so as to make the quartz glass crucible.

10. The apparatus of claim 9, further comprising a common guide rail along which said first and second reciprocating means move reciprocally between the first and intermediate chambers and between the second and intermediate chambers in an alternate manner so that one of the first and second shifting means is always positioned in the intermediate chamber.

11. The apparatus of claim 9, wherein each of the first and second feeding means includes a hopper having a lower open end, a pipe joined to the lower open end of the hopper, and a valve for controlling the volume of the material fed through the pipe into the crucible.

12. The apparatus of claim 9, wherein each of the first and second tool means include tool control means for positioning said first and second tool means respectively within said first and second rotation crucibles and for withdrawing said first and second tool means from said rotation crucibles.

13. The apparatus of claim 9, wherein the heating and fusing means includes three electrodes having three poles, and guide means along which the electrodes move in a vertical direction.

14. The apparatus of claim 11, wherein the housing has further a make-up chamber positioned located above and coextensive with first and second chambers and said intermediate chamber.

15. The apparatus of claim 14, further comprising a make-up tank and means for moving said make-up tank within make-up chamber in such a way that the particulate material can be stored in said make-up tank and fed to the hoppers within the first and second chambers.

16. The apparatus of claim 9, wherein said first and second rotation means include means for continuously rotating said rotation crucibles as said rotation crucibles move from the first and second chambers to the intermediate chamber.

* * * * *

UNITED STATES PATENT AND TRADEMARK OFFICE
CERTIFICATE OF CORRECTION

PATENT NO. : 5,082,484
DATED : January 21, 1992
INVENTOR(S) : KOSEKI et al It is certified that error appears in the above-identified patent and that said Letters Patent is hereby corrected as shown below:

Column 4, line 20, delete "of".

Column 5, line 16, after "and" insert --second chambers;--.

Signed and Sealed this

Twenty-fifth Day of May, 1993

Attest:

MICHAEL K. KIRK

Attesting Officer    Acting Commissioner of Patents and Trademarks